United States Patent
Maa et al.

(10) Patent No.: US 9,699,855 B2
(45) Date of Patent: *Jul. 4, 2017

(54) ADD-ON IPS CONTROLLER FOR LED LIGHTING DEVICE

(71) Applicant: Aleddra Inc., Renton, WA (US)

(72) Inventors: Chia-Yiu Maa, Bellevue, WA (US); Chun-Te Yu, Renton, WA (US)

(73) Assignee: ALEDDRA INC., Renton, WA (US)

( * ) Notice: Subject to any disclaimer, the term of this patent is extended or adjusted under 35 U.S.C. 154(b) by 17 days.

This patent is subject to a terminal disclaimer.

(21) Appl. No.: 14/869,522

(22) Filed: Sep. 29, 2015

(65) Prior Publication Data

US 2017/0064788 A1    Mar. 2, 2017

Related U.S. Application Data

(63) Continuation-in-part of application No. 14/842,612, filed on Sep. 1, 2015.

(51) Int. Cl.
| | | |
|---|---|---|
| *H04B 10/00* | (2013.01) | |
| *H05B 33/08* | (2006.01) | |
| *H05B 37/02* | (2006.01) | |
| *H04B 10/116* | (2013.01) | |
| *H04B 10/50* | (2013.01) | |
| *H04B 10/54* | (2013.01) | |
| *H04B 10/564* | (2013.01) | |

(52) U.S. Cl.
CPC ....... *H05B 33/0854* (2013.01); *H04B 10/116* (2013.01); *H04B 10/502* (2013.01); *H04B 10/541* (2013.01); *H04B 10/564* (2013.01); *H05B 33/0815* (2013.01); *H05B 37/0272* (2013.01)

(58) Field of Classification Search
CPC .... H04B 10/116; H04B 10/40; H04B 10/112; H04B 10/114; H04B 10/1149; H05B 33/0842; H05B 33/0854; H05B 33/0869; H05B 33/0227; H05B 33/0272
USPC ........ 398/172, 128, 130, 118, 119, 135, 115, 398/127, 33, 182, 183, 186, 187, 189; 315/307, 291, 294, 149, 58, 61, 152, 312, 315/318
See application file for complete search history.

(56) References Cited

U.S. PATENT DOCUMENTS

| | | | |
|---|---|---|---|
| 8,107,825 B2 * | 1/2012 | Rajagopal | H04B 10/1149 398/172 |
| 8,422,889 B2 * | 4/2013 | Jonsson | H04L 12/2827 398/133 |

(Continued)

*Primary Examiner* — Hanh Phan
(74) *Attorney, Agent, or Firm* — Han IP Corporation; Andy M. Han

(57) ABSTRACT

An add-on IPS (Indoor Positioning System) controller for an LED lighting device includes a power input port, a power output port, a housing, a control unit in the housing, and at least one data signal receiver in the control unit. A power input of the control unit is connected to the power input port. A power output of the control unit is connected to the power output port. The data signal receiver is configured to receive data from the external data source. The control unit further includes a two-way wireless module configured to send and receive the data between the IPS server and the IPS-enabled end-user device. The control unit is configured to activate and deactivate the power output port to supply output voltage responsive to the data signals.

26 Claims, 9 Drawing Sheets

(56) References Cited

U.S. PATENT DOCUMENTS

| | | | | |
|---|---|---|---|---|
| 9,089,031 B2* | 7/2015 | Maa | ............... | H05B 33/0842 |
| 2015/0372753 A1* | 12/2015 | Jovicic | ............ | H04B 10/116 |
| | | | | 398/172 |
| 2016/0352422 A1* | 12/2016 | Yue | ................. | H04B 10/116 |

* cited by examiner

ADD-ON IPS CONTROLLER FOR LED LIGHTING DEVICE

CROSS REFERENCE TO RELATED PATENT APPLICATION

The present disclosure is a continuation-in-part (CIP) of U.S. patent application Ser. No. 14/842,612, filed on 1 Sep. 2015, which is incorporated by reference in its entirety.

BACKGROUND

Technical Field

The present disclosure pertains to the field of lighting devices and, more specifically, proposes an add-on Indoor Positioning System (IPS) controller for a light-emitting diode (LED) lighting device.

Description of Related Art

The Global Positioning System (GPS) while effective for outdoor positioning applications has two key disadvantages when it comes to indoor use. Firstly, GPS signal is usually blocked or significantly weakened inside a building. Secondly, it doesn't differentiate on height, so it can't tell whether a person is on the first floor or the second floor inside a building. The Indoor Positioning System (IPS) recently appeared on the market overcomes these drawbacks, and furthermore provides a finer position resolution down to 10 cm, vs. 1 m by GPS. Some IPS system resides in LED lighting fixtures, and other doesn't. LED-based IPS is more popular due to the facts that lighting fixture is generally available everywhere inside a building and that a new technology, Visible Lighting Communication (VLC), enables IPS data broadcasting via LED light according to the fixture's physical location.

VLC, a subset of optical wireless communication technologies, is a data communication using visible light between 400 and 800 THz (780-375 nm). The technology transmits data by adjusting the intensity or the on-off cycle of the visible light. Popular Light Intensity Baseband Modulation (LIBM) includes On-Off Keying (OOK), Pulse Amplitude Modulation (PAM), and Pulse Position Modulation (PPM). The first general of VLC device achieved 10 kbit/s data transmission rate by using fluorescent lamp. Recently LED light source was used and this dramatically improved the VLC data rate up to 500 Mbit/s. VLC has several advantages over traditional wireless communication technologies. First of all, its spectrum is license-free. Secondly, it is free of RF health concerns. Thirdly, it has the potential of delivering ubiquitous computing since light-producing devices as such lamps (indoor/outdoor), TVs, traffic signs, street light, car headlights/taillights, and commercial displays are everywhere. VLC data communication is more secure since data can only be received where the VLC light source is visible. It is also less susceptible to RF-noise. Lastly, the high data rate offered by LED light source makes it very cost-effective for delivering large of amount of data over a short distance.

FIG. 1 depicts schematically a typical LED-based IPS system. The IPS Service Center comprises of IPS server, IPS database, and non-IPS database. The non-IPS database may contain application data such as merchandize promotion information, and the IPS database may record the indoor location of each fixture and the location association information of the merchandizes and the fixtures. The IPS server may combine the information from both database to alert the shopper inside a supermarket regarding the location and the promotion of a merchandize. The IPS server may further connect to a user profiling system over the Internet cloud service such that it can match shopper's personal purchasing preference and/or history when sending the promotional message via the IPS system.

The broadcast IPS data may be sent from the IPS server to the IPS-enabled LED lighting device via wired or wireless connection. The IPS-enabled LED lighting device may comprise of a VLC module, an LED Driver, one or more LEDs, and a two-way wireless module. After receiving the broadcast IPS data, the IPS-enabled LED lighting device may relay the information through either the VLC module or the two-way wireless module to the IPS receiver device. When relaying IPS data through the VLC module, the LIBM modulated signal stream is fed to the LED driver which in turn drives the LED diode to emit VLC encoded data by adjusting the light intensity at a frequency higher than human eye can perceive. Inside the IPS receiver device, there is a photo diode for receiving the VLC data, and the received data is fed to the VLC (software) module for demodulation. The IPS receiver device is typically a smartphone or a specially designed electronic device.

When relaying IPS data through the two-way wireless module, the data is communicated directly to the IPS receiver device wirelessly, through WiFi, Bluetooth, Low Energy Bluetooth, infrared, or any other two-way wireless communication technologies. The IPS receiver device may communicate with the two-way wireless module residing in the IPS-enabled LED lighting device, or alternatively, it may communicate through its regular wireless data communication channel directly with the IPS service center for additional information and service. The location of the IPS receiver device is calculated according to its distance relative to the closest IPS-enabled LED lighting device(s).

The conventional approach of designing an IPS-enabled LED lighting devices is to embed the VLC module and the two-way wireless module inside an integrated LED lighting device as shown in FIG. 1. This approach has the advantage of achieving the maximal controllability of the LED lighting device. It however severely limits the deployment of the IPS technology, because firstly it requires existing LED lighting devices to be replaced with IPS-enabled ones, which could induce significant costs on material and labor for replacement. Secondly, once an IPS controller is embedded inside of an LED lighting device, it can't be upgraded or improved easily. Given the long life of LED lighting device of 10-20 years, it is foreseeable that the IPS technology would make significant improvement over this time span on data transmission speed and functionality. An embedded IPS controller design would prevent the user from taking the advantage of the latest and more cost-effective IPS technology. The present disclosure overcomes the above limitations of embedded IPS controller design by extending and applying the invention of U.S. patent application Ser. No. 14/842,612, titled "Add-on VLC Controller for LED Lighting Device", to IPS controller.

SUMMARY

In one aspect, an add-on IPS controller for the LED lighting device comprises a power input port, a power output port, a housing, a control unit in the housing, and the control unit may include a two-way wireless module and at least one control signal receiver in the control unit. The power input of the control unit connects to the power input port. The power output of the control unit connects to the power output port. The control signal receiver receives external control signals. In this aspect of the present disclosure, the add-on IPS controller may or may not control the lighting function of the LED lighting device. It emphasizes on the add-on feature of the controller that may be attached to the LED lighting device, rather than replacing the lighting device entirely.

In some embodiments, the control unit activates the power output port to supply output voltage when it receives an "ON" signal. The control unit deactivates the power output port when it receives an "OFF" signal. With these embodiments, the add-on IPS controller may at least control the on-off function of the LED lighting device.

In some embodiments, the control unit may further include a VLC module which may be configured to convert the received data into one or more LIBM-modulated signals by varying a frequency at which one or more LEDs of the LED lighting device are turned on and off and by varying a light intensity of the one or more LEDs.

In some embodiments, the control unit may include a dimmer configured to control the output voltage or current flowing through the power output port according to the one or more LIBM-modulated signals.

In some embodiments, the dimmer may be a voltage-based step-dimmer and configured to control the output voltage of the power output port according to the one or more LIBM-modulated signals.

In some embodiments, the voltage-based step-dimmer may include a control signal input port, a controllable switcher, and a transformer. The control signal input port may be connected to the controllable switcher. An output of the controllable switcher may be connected to an input of the transformer. An output of the transformer may be connected to the power output port.

In some embodiments, the voltage-based step-dimmer may be configured to supply power at a voltage level same as an external input power, at a voltage level lower than the external input power, or at zero voltage.

In some embodiments, the dimmer may be a voltage-based linear dimmer comprising a control signal input port, a step-motor, and an autotransformer. The control input signal may be connected to and configured to control the step-motor. The step-motor may be configured to control an input level of the autotransformer and cause an output level of the autotransformer to change in a linear fashion.

In some embodiments, the dimmer may be a current-based linear dimmer configured to control the effective operation cycle of an AC input current wave from 360 degrees down to 0 degree in a linear or step-wise fashion according to the control signal.

In some embodiments, the data signal receiver may be configured to receive control signals through infra-red signals, WiFi signals, Bluetooth signals, low-energy Bluetooth signals, power-line-transmitted signals, a control signal line, or a combination thereof.

In some embodiments, the data signal receiver may include a photo diode or any light sensing component configured to receive VLC or any wireless optical communications data.

In some embodiments, the control unit may include a rectifier configured to convert an AC input current to a DC output current.

In some embodiments, the controller may include a connecting mechanism that attaches the controller directly onto the LED lighting device.

In some embodiments, the connecting mechanism, disposed between the controller and the LED lighting device, may include the power output port having a form of any screw-in shaped socket, hole-shaped socket, or any existing standard electrical socket.

In some embodiments, the power input port may have a form of any screw-in shaped connector, pin-shaped connector, or any existing standard electrical connector.

In some embodiments, a shape of the power input port may match a shape of the power output port.

In some embodiments, a shape of the power input port may not match a shape of the power output port.

In some embodiments, the housing may define a concavity configured to house the socket of the power output port.

In some embodiments, the data signal receiver may be configured to wirelessly receive the data through the two-way wireless module from the external data source.

In some embodiments, the two-way wireless module may be configured to receive data through infra-red signals, WiFi signals, Bluetooth signals, low-energy Bluetooth signals, or other two-way wireless communication signals.

In some embodiments, the add-on IPS controller may include at least one LED driver. In other embodiments, the add-on IPS controller may not include any LED driver.

In some embodiments, the add-on IPS controller may be configured to activate and deactivate the one or more LEDs in a visually discernable manner in response to end-user triggered control signals. This feature is particularly useful for security applications where the IPS-enabled LED lighting device could flash above the end user or sound an alarm, to either scare away a criminal or to alert the security guard on the exact location of the user who originates the alert signal. For healthcare application, imagining when an elderly person falls on the floor and triggers a "need help" message to the IPS service center. The paramedic personnel could locate the exact location of the caller immediately inside a building with the help of a flashing IPS-enabled LED lighting device, thus saving both time and life. The active feedback mechanism of the add-on IPS controller in response to the end-user trigger signals is not limited to visual discernable feedback. The active feedback mechanism can be audible or other perceptive signals. In certain application such as security application, it may be desirable to configure the active feedback mechanism such that it can only be detected by special designed electronic device, and not by human, so as not to alert the criminal in action.

In another aspect of the present disclosure, an integrated LED lighting device comprises a power input port for receiving external power, at least one LED driver, one or more LEDs, a control unit comprising at least one control signal receivers and a VLC module. The control signal receiver may be configured to receive external data signals through infra-red signals, WiFi signals, Bluetooth signals, low-energy Bluetooth signals, power-line-transmitted signals, a control signal line, or a combination thereof. The VLC module may be configured to convert the received data signals into one or more light intensity baseband modulation (LIBM)-modulated signals by varying a frequency through the at least one LED driver at which one or more LEDs are turned on and off and by varying a light intensity of the one or more LEDs. The LED lighting device is configured to provide an active feedback mechanism in response to end-user triggered control signals.

In some embodiments of the integrated LED lighting device, the active feedback mechanism may be visual, audible, other perceptive signal, or the combination thereof, that is perceivable by human or detectable by electronic device. Further in some embodiments, the active feedback mechanism may be achieved by activating and deactivating the one or more LEDs to be visually perceivable by human eyes.

In some embodiments of the integrated LED lighting device, the control unit may comprise a two-way wireless module which is configured to receive external data signals through infra-red signals, WiFi signals, Bluetooth signals, low-energy Bluetooth signals, or other two-way wireless communication signals.

The claims and advantages will be more readily appreciated as the same becomes better understood by reference to the following detailed description and the accompanying drawings showing exemplary embodiments, in which like reference symbols designate like parts. For clarity, various parts of the embodiments in the drawings are not drawn to scale.

BRIEF DESCRIPTION OF THE DRAWINGS

The accompanying drawings are included to aid further understanding of the present disclosure, and are incorporated in and constitute a part of the present disclosure. The drawings illustrate a select number of embodiments of the present disclosure and, together with the detailed description below, serve to explain the principles of the present disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED EMBODIMENTS

Overview

Various implementations of the present disclosure and related inventive concepts are described below. It should be acknowledged, however, that the present disclosure is not limited to any particular manner of implementation, and that the various embodiments discussed explicitly herein are primarily for purposes of illustration. For example, the various concepts discussed herein may be suitably implemented in a variety of LED lighting devices having different form factors.

The present disclosure discloses an add-on IPS controller for the LED lighting device that allows for new functionality to be added to the lighting device without entirely replacing the LED lighting device. For example, the existing LED lighting device may not have dimming capability. By using an add-on IPS controller with dimming capability, the LED lighting device would become dimmable without any modification to the rest of the LED lighting device. Similarly, an add-on IPS controller with Bluetooth/WiFi module would augment the existing LED lighting device with additional wireless communication capability.

Separately, a new add-on IPS controller may be used to upgrade existing functionality. For example, the first generation VLC module is able to achieve a data rate at 250 Mbps. In a few year, the VLC technology may double the rate to 500 Mbps. By using the add-on IPS controller approach, the user can upgrade the controller with the latest model with incremental cost. If the user use an embedded IPS controller in the LED lighting device, a VLC module upgrade will require the complete replacement of the LED lighting device. This not only costs more, but also create more environmental waste out of the otherwise perfectly operational LED lighting device. When using add-on IPS controller, an end user would be able to enjoy these upgrade functionalities without making any modification to the existing LED lighting device.

Additionally, different add-on IPS controllers would also allow for product differentiation and application-based variation. For examples, a standard IPS controller may include a Bluetooth-based two-way wireless module. In the hospital, however, the use smartphones or any RF emitting devices are restricted. In this case, the add-on IPS controller with a two-way Bluetooth wireless module may be replaced cost-effectively by another add-on IPS controller with a two-way infrared wireless module.

Example Implementations

Figure 1:
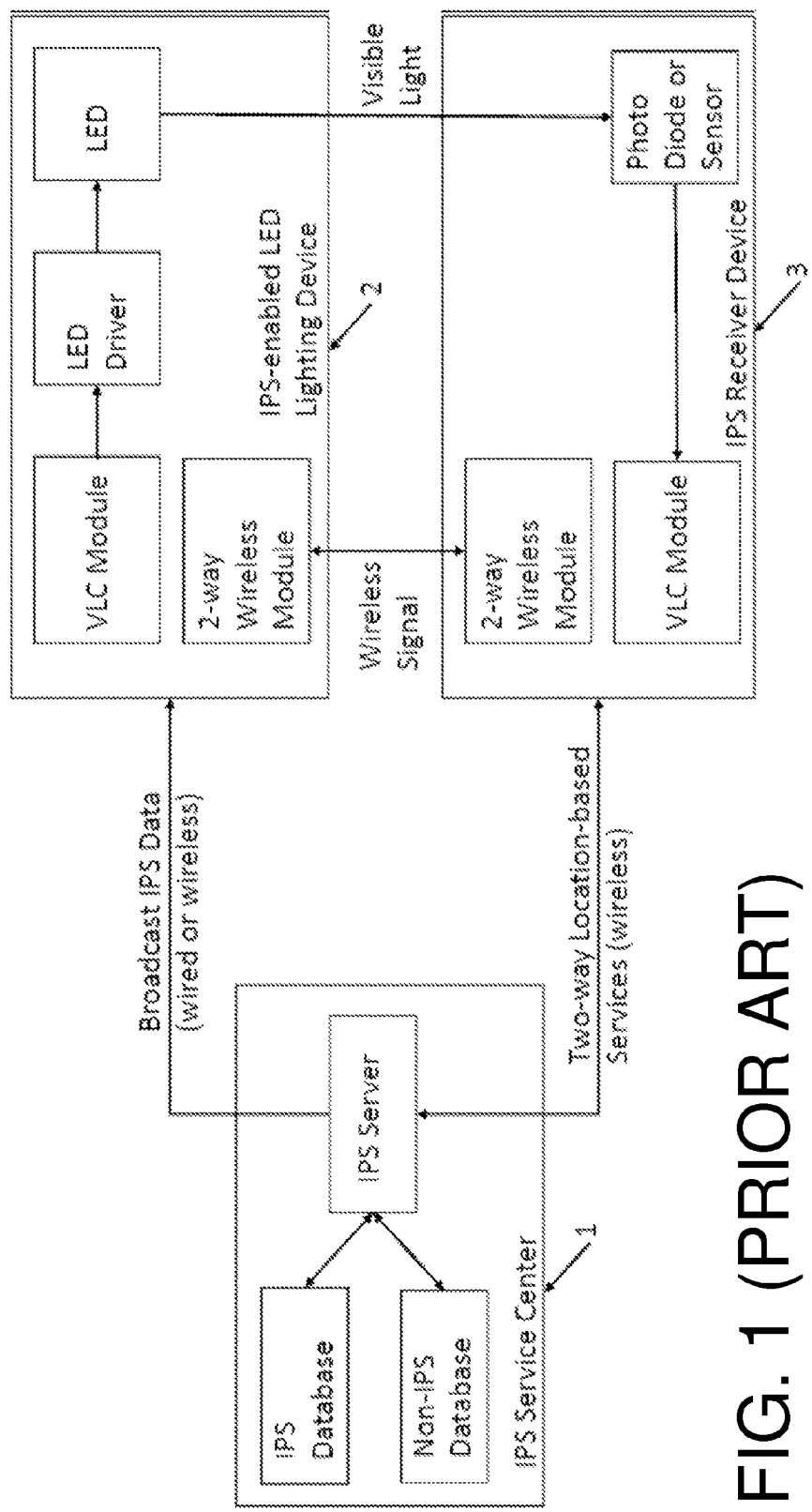
FIG. 1 schematically depicts the process-level diagram of a typical LED-based IPS system.
Figure 2:
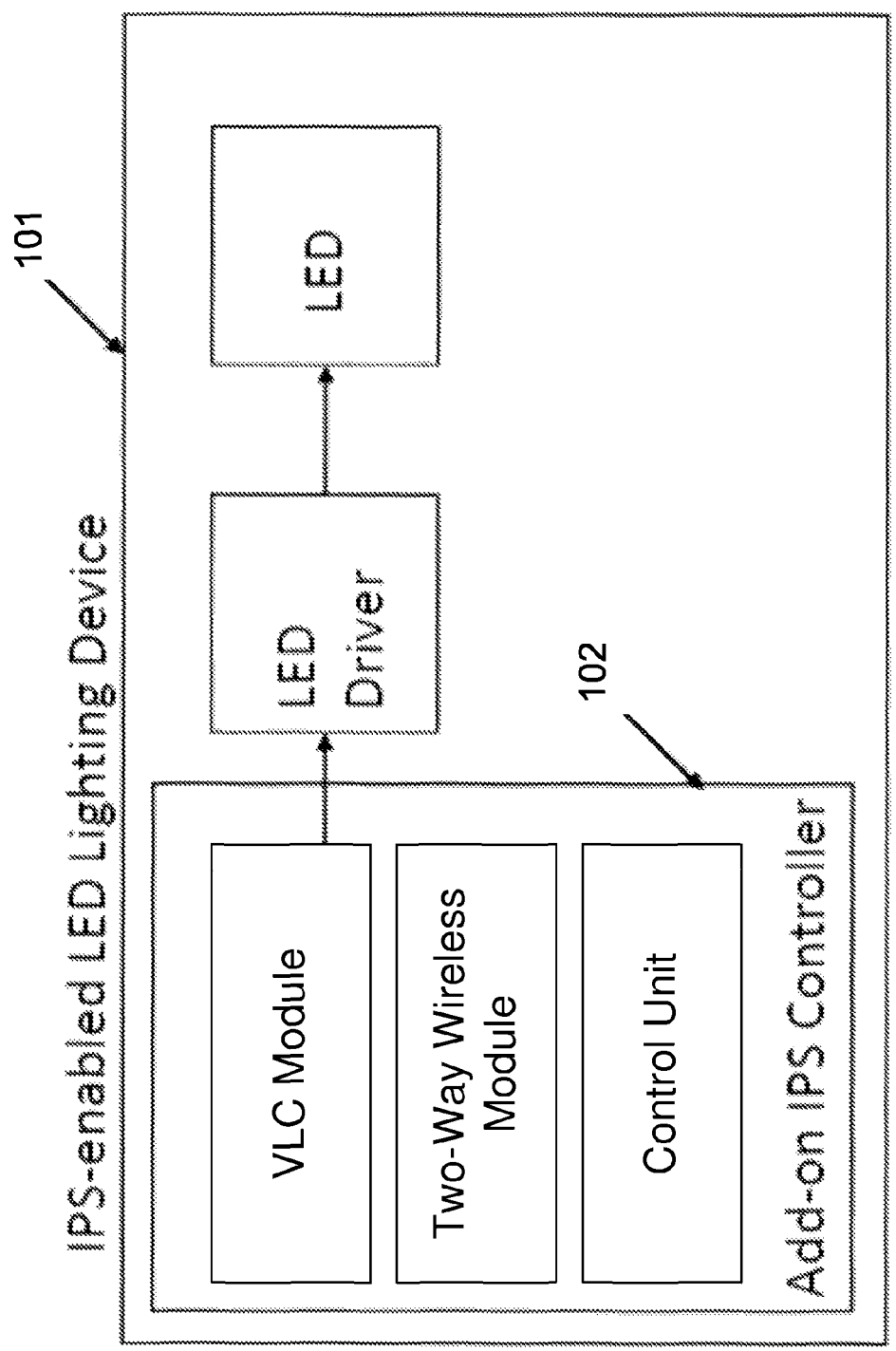
FIG. 2 schematically depicts a process-level embodiment of the present disclosure where an LED driver is not a part of the add-on IPS controller.
Figure 3:
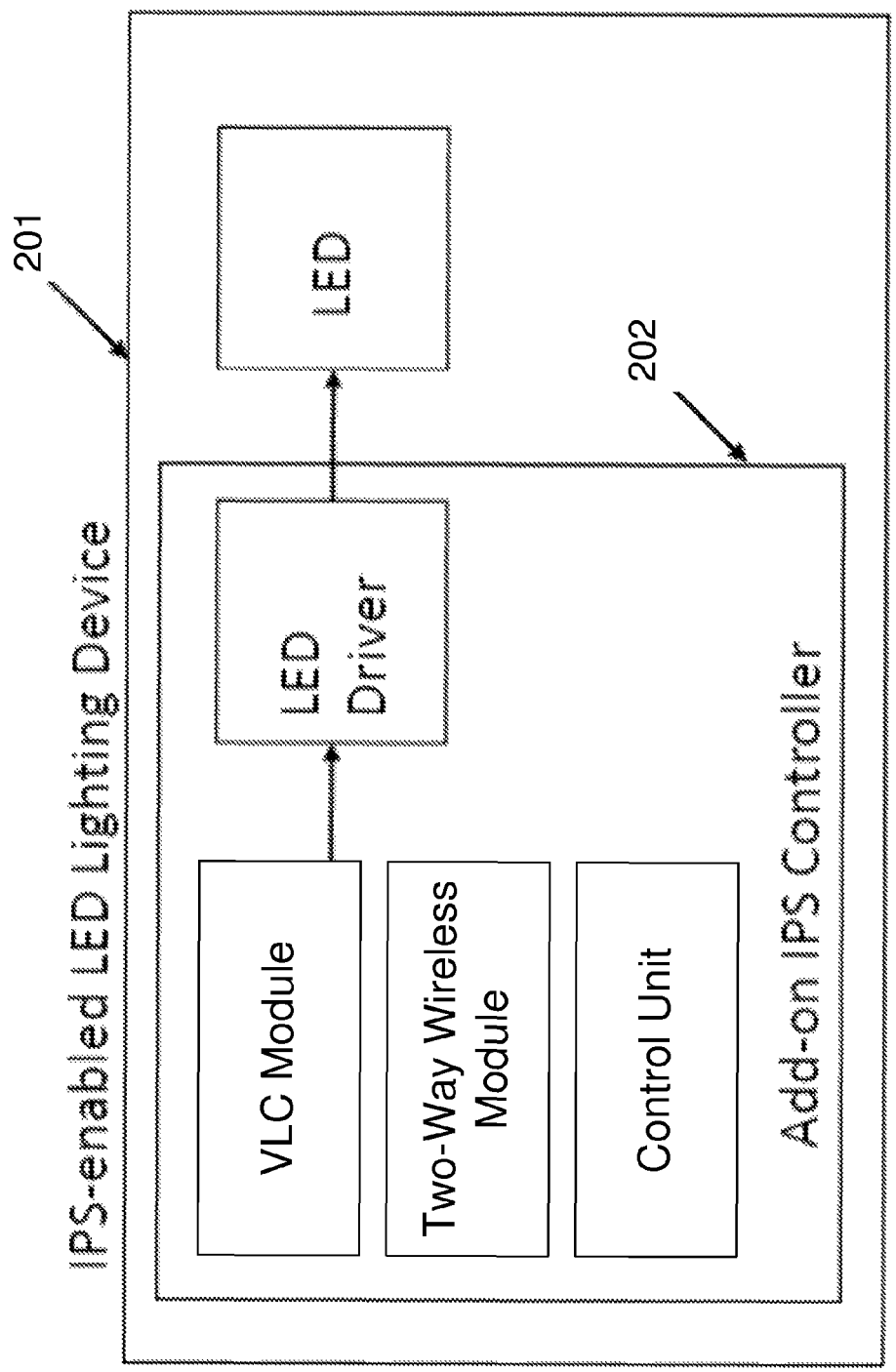
FIG. 3 schematically depicts another process-level embodiment of the present disclosure where an LED driver is a part of the add-on IPS controller.

FIG. 2 and FIG. 3 illustrate two non-limiting process-level embodiments of the add-on IPS controller of the present disclosure. While they both include a two-way wireless module and a VLC module, the two-way wireless module alone is sufficient to provide the two-way IPS communication. The VLC module is optional, but it enhances the one-way broadcasting data bandwidth significantly. In FIG. 2, the add-on IPS controller 102 of an IPS-enabled LED lighting device 101 comprises of a data signal receiver for receiving external input data, a VLC module for converting received data into one or more LIBM modulated signals. In this embodiment, the LED driver for the LED lighting device 101 is not part of the add-on IPS controller 102. The output of the VLC module is the one or more LIBM modulated signals, which in turn powers on/off the driver of the LED lighting device 101, causing one or more LEDs of the LED lighting device 101 to emit light responsive to the one or more LIBM modulated signals. Thus, the VLC module may be coupled to control operations of one or more LEDs of the LED lighting device 101, and may convert the received data into the one or more LIBM modulated signals by varying a frequency at which the one or more LEDs of the LED lighting device 101 are turned on and off and by varying a light intensity of the one or more LEDs. When a dimming function is present in either the VLC module or the driver, the VLC module could also adjust its output power level so that the light intensity of the LED diode can also be adjusted. This way the VLC module could be used for transmitting Pulse Amplitude Modulation (PAM) based signals.

FIG. 3 is another process-level embodiment of the present disclosure where the add-on IPS controller 202 of an IPS-enabled LED lighting device 201 includes the LED driver for the LED lighting device 201. There are two advantages of moving the LED driver into the add-on IPS controller 202. Firstly, it enables a better integration between the VLC module and the LED driver, thus achieving a better performance or a more flexible functionality or both. Secondly, since the LED driver has a shorter lifetime comparing to the LED diodes and the rest of the mechanical parts of the LED lighting device 201, by separating the driver from the rest of the LED lighting device 201 enables the replacement and the upgrade of the LED driver more costly effectively and environmentally friendly.

Notwithstanding the two non-limiting embodiments in FIG. 2 and FIG. 3, in some embodiments of the add-on IPS controllers 102 and 202, the VLC module or the on-off control of the LED lighting device 101 and 201 is not included. In terms of functionality, the add-on IPS controller 102 and 202 in some embodiments include the following functions/components: (1) the passing of the power from the external power supply to the LED lighting device 101/201, (2) at least one IPS-enabled data signal receiver for receiving external data, and (3) a two-way wireless module for communicating with the IPS-enabled receiver device bi-directionally.

Figure 4:
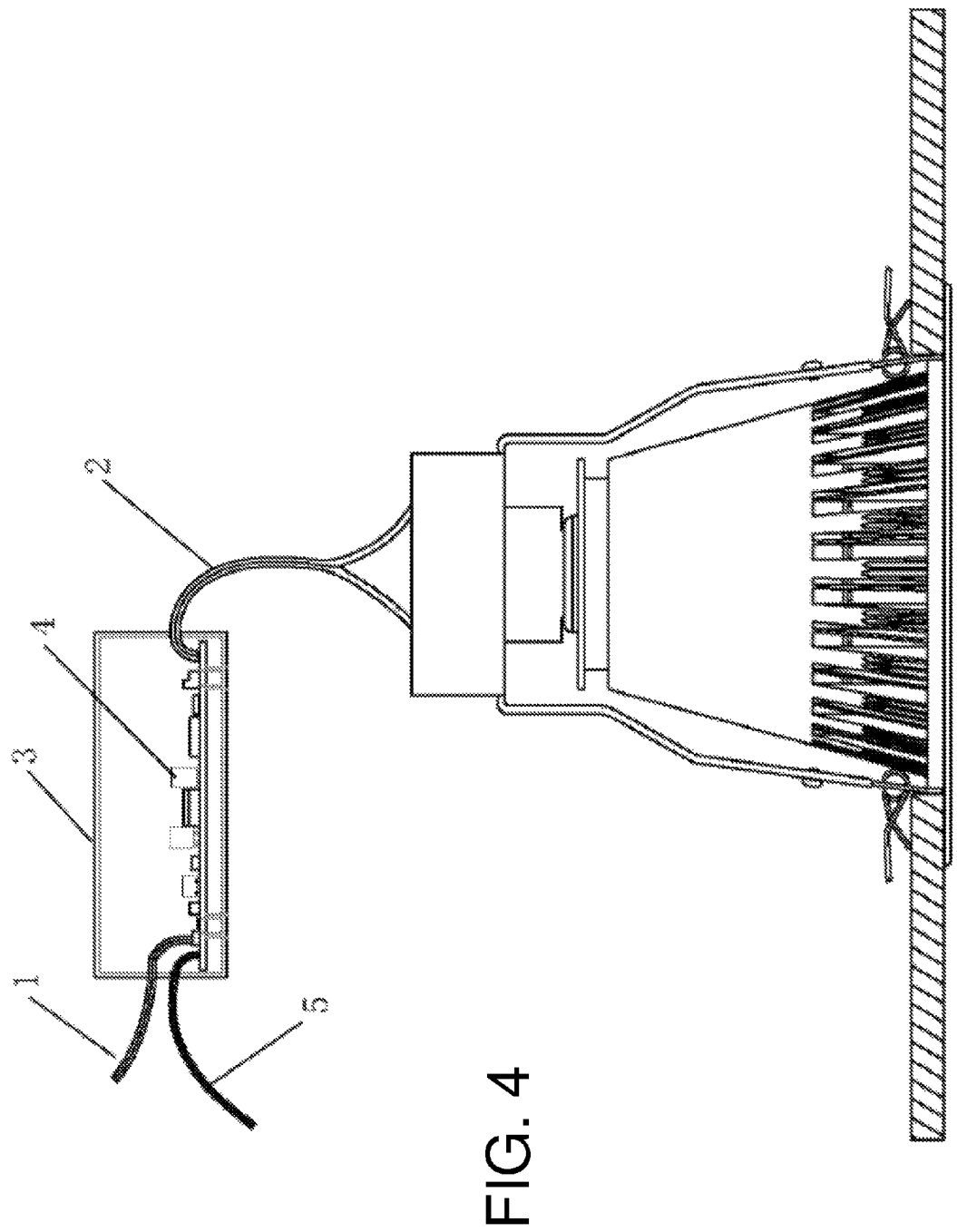
FIG. 4 schematically depicts an embodiment of the present disclosure.
Figure 5:
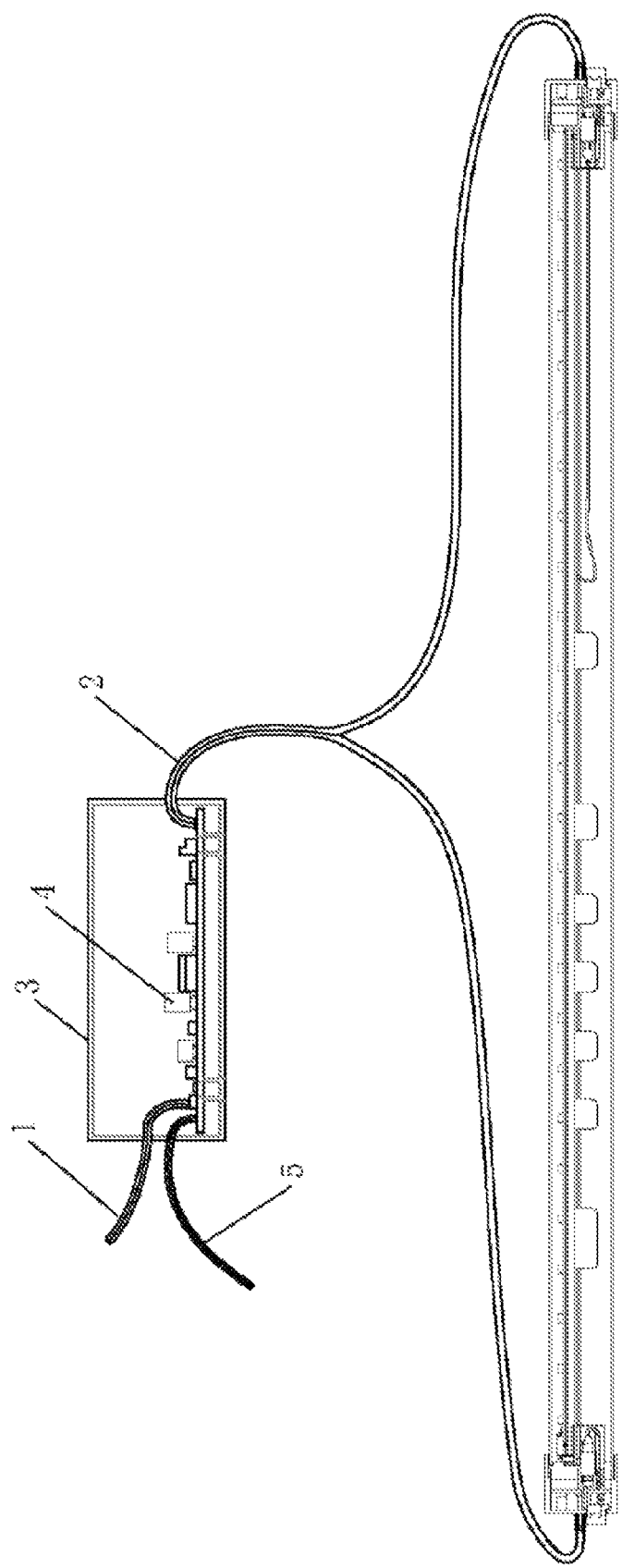
FIG. 5 schematically depicts another embodiment of the present disclosure.

FIG. 4 and FIG. 5 illustrate one non-limiting embodiment of the add-on IPS controller of the present disclosure. An add-on IPS controller for LED lighting device comprises a power input port 1, a power output port 2, a housing 3, a control unit 4 in the housing 3, and a data signal receiver 5. The power input port 1 connects the external power to the control unit 4. The power output port 2 connects the control unit 4 to the LED lighting device.

When the data signal receiver 5 receives an ON signal, the control unit 4 activates the output power port 2; when the data signal receiver 5 receives an OFF signal, the control unit deactivates the output power port 2. The data signal receiver may be an infra-red receiver, a WiFi receiver, a Bluetooth receiver, a power-line-transmitted signal receiver, a receiver controlled via a control signal line, or a VLC-capable photo diode.

Figure 6:
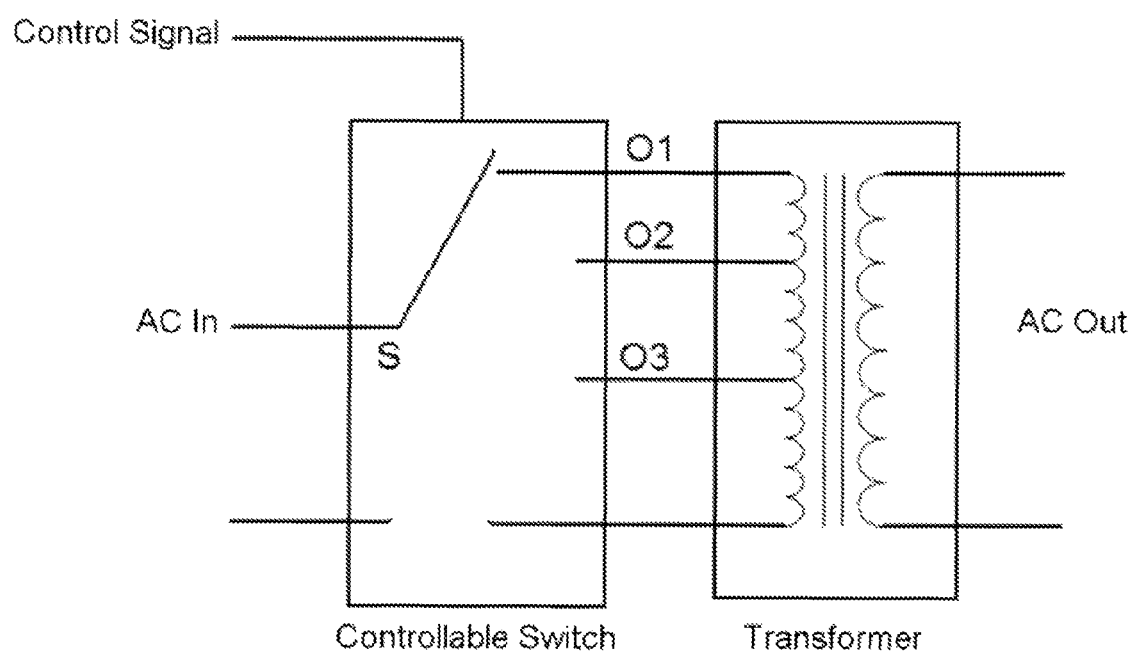
FIG. 6 schematically depicts an embodiment of the voltage-based step-dimmer of the present disclosure.

In other embodiments of the present disclosure, the control unit includes a dimmer for adjusting the output voltage or current level of the power output port. Some of the VLC LIBM modulation uses, in addition to the on/off duration of the light, the intensity of the light for data transmission. So a dimmer is required for this type of add-on IPS controller. FIG. 6 illustrates a non-limiting embodiment of a voltage-based step dimmer comprising a control signal input port, a controllable switch, and a transfer. The control signal input connects to and controls the controllable switch. The output of the controllable switch connects to the input of the transformer. The output of the transformer connects to the power output port. The voltage-based step dimmer controls the output voltage level of the transformer to equal the input voltage, to be lower than the input voltage, or to zero voltage, according to the received control signal. More specifically, the control signal controls whether the controllable switch connects the switch S to any of the output ports O1, O2, or O3, or connects to none of them, resulting no output voltage. When the control signal activates the output port O1, the output voltage level of the transformer is the same as the AC input voltage. When the control signal activates the output port O2, the output voltage level of the transformer is lower than the AC input voltage. When the control signal activates the output port O3, the output voltage level of the transformer is set still lower than the AC input voltage. When the control signal does not activate any of the output ports, the transformer generates no output voltage.

In another embodiment, a linear voltage-based dimmer that smoothly adjusts the output voltage may comprise a control signal input port, a step motor, and an autotransformer. The control signal connects to and controls the step motor, which in turn controls the input voltage level of the autotransformer and consequently the output voltage level of the transformer.

In another embodiment, a current-based dimmer may be used to adjust the operation cycle of the AC input current wave from 360 degree down to 180 degree, thus reducing the overall power output efficiency to 50%. Similarly, the current-based dimmer may be step-dimming or linear dimming, depending on whether the adjustment of the output current is step-wise or linear.

Figure 7:
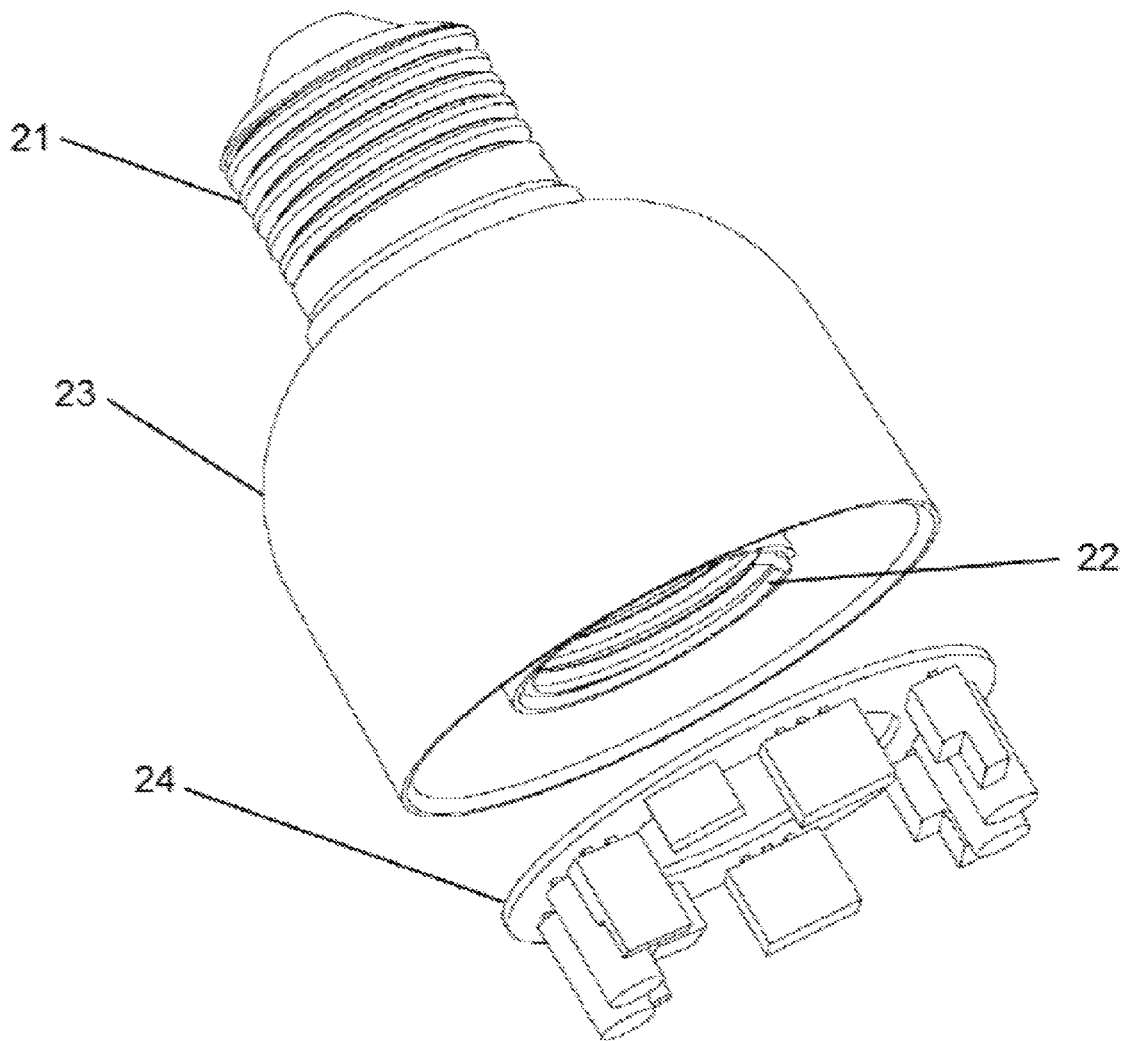
FIG. 7 schematically depicts another embodiment of the present disclosure.
Figure 8:
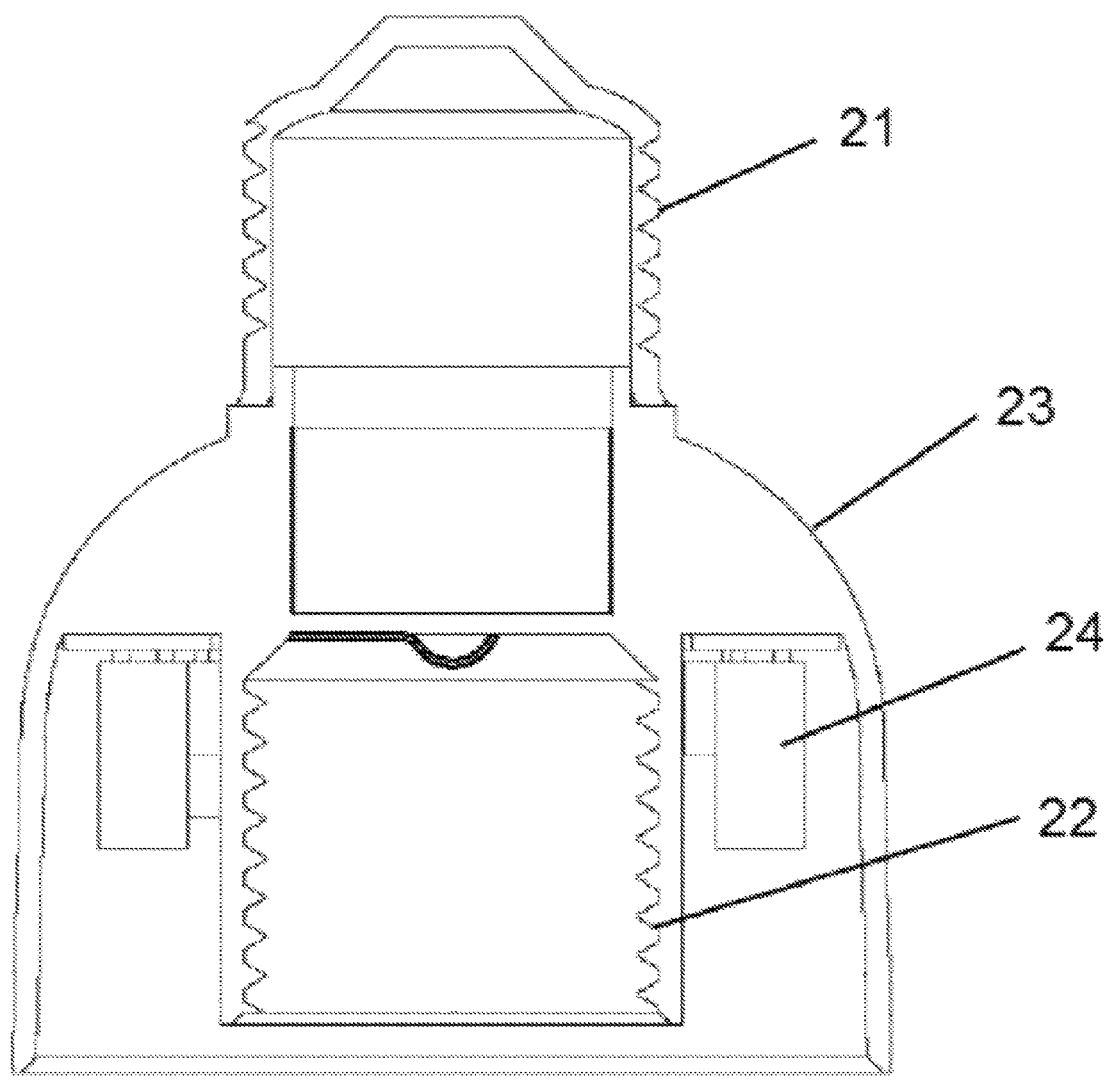
FIG. 8 schematically depicts a fourth embodiment of the present disclosure from another angle.
Figure 9:
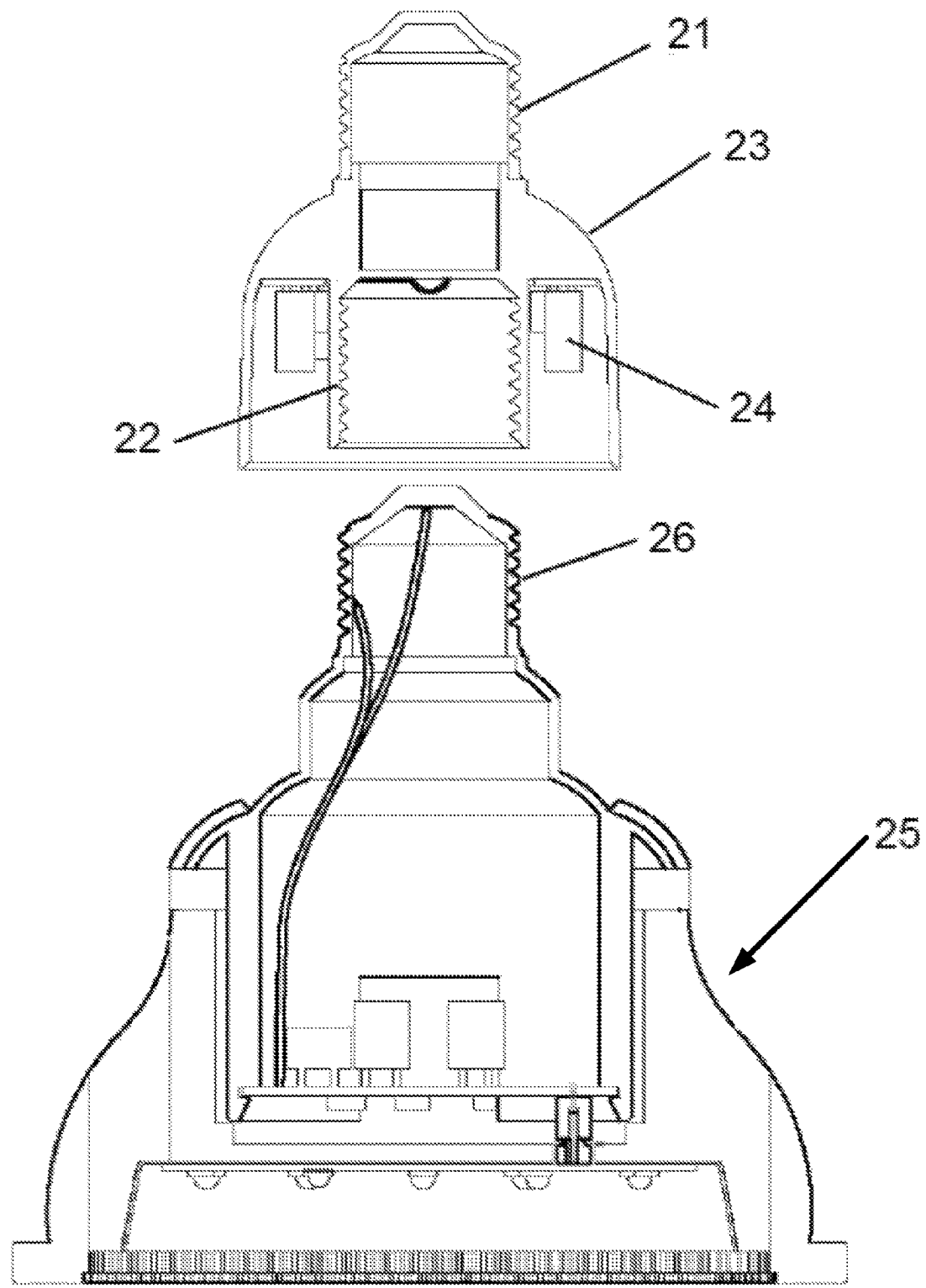
FIG. 9 schematically depicts the application of the fourth embodiment of the present disclosure.

FIG. 7 and FIG. 8 illustrate another non-limiting embodiment of the add-on IPS controller of the present disclosure in the form of an adapter that it may be attached directly to the LED lighting device. The add-on IPS controller adapter comprises a power input port 21, a power output port 22, a housing 23, and a control unit 24. The data signal receiver is not shown in the figures for simplicity. When the data signal receiver receives an ON signal, the control unit 4 activates the output power port 22; when the data signal receiver receives an OFF signal, the control unit deactivates the output power port 22. The power input port 21 takes the form of a screw-in head that may be screwed into a standard screw-in socket. The power output port 22 takes the form of a screw-in socket so that any LED lighting device with a screw-in head may be screwed into the add-on IPS controller adapter. FIG. 9 illustrates the application of the add-on IPS controller adapter and an LED lighting device 25 with a screw-in head 26.

The power input port 21 may take the form of any screw-in shaped connector (such as E-base), pin-shaped connector (such as MR-base, GU-base, PL-base), or any existing standard electrical connector. Similarly, the power output port 22 may take the form of any screw-in shaped socket, hole-shaped socket, or any existing standard electrical sockets. Alternatively, the shape of the power input port 21 may or may not match the shape of the power output port 22. Alternatively, the housing 23 may include a concavity to house the socket of the power output port 22.

In some embodiments, the connecting mechanism between the controller and the LED lighting device comprises the power output port which takes the form of any screw-in shaped socket, hole-shaped socket, or any existing standard electrical socket. Similarly, in some embodiments, the power input port may take the form of any screw-in shaped connector, pin-shaped connector, or any existing standard electrical connector. Moreover, in some embodiments, the shape of the power input port may or may not match the shape of the power output port. When the shape of the power input port does not match the shape of the power output port, the add-on IPS controller provides the additional functionality of being an electrical connector adaptor.

In some embodiment, the two-way wireless module may be configured for communicating with either the IPS server or the IPS-enabled receiver device or both via wireless communication technology such as infra-red, WiFi, Bluetooth, low-energy Bluetooth, a two-way VLC communication, or any other two-way wireless communication technology.

In some embodiments, the control unit may be configured to provide an active feedback in response to end-user triggered control signals. In some embodiments, the active feedback may include visual, audible, other perceptive signals, or a combination thereof. The active feedback may be either human-discernable as perceivable by human without using special equipment, or machine-discernable where special electronic device is required to detect the active feedback signal. One example of machine-discernable active feedback is to sound an audio alarm at a frequency higher than human ear can perceive. In some embodiments, the active feedback may be achieved by the control unit activating and deactivating the one or more LEDs to be visually perceivable by human eyes In another aspect of the present disclosure, an integrated LED lighting device may include a power input port for receiving external power, at least one LED driver, one or more LEDs, a control unit comprising at least one control signal receivers and a VLC module, wherein the control signal receiver may be configured to receive external data signals. The VLC module may be configured to convert the received data signals into one or more light intensity baseband modulation (LIBM)-modulated signals by varying a frequency through the at least one LED driver at which one or more LEDs may be turned on and off and by varying a light intensity of the one or more LEDs. The control unit may be configured to provide an active feedback in response to end-user triggered control signals.

In some embodiments of the integrated LED lighting device, the active feedback may include visual, audible, other perceptive signal, or a combination thereof, that is perceivable by human or detectable by electronic device. Further in some embodiments, the active feedback may be achieved by the control unit activating and deactivating the one or more LEDs to be visually perceivable by human eyes.

In some embodiments of the integrated LED lighting device, the control unit may include a two-way wireless module configured to receive external data signals through infra-red signals, WiFi signals, Bluetooth signals, low-energy Bluetooth signals, or other two-way wireless communication signals.

Additional and Alternative Implementation Notes

Although the techniques have been described in language specific to certain applications, it is to be understood that the appended claims are not necessarily limited to the specific features or applications described herein. Rather, the specific features and examples are disclosed as non-limiting exemplary forms of implementing such techniques.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

For the purposes of this disclosure and the claims that follow, the terms "coupled" and "connected" may have been used to describe how various elements interface. Such described interfacing of various elements may be either direct or indirect.

What is claimed is:

1. A light-source-less add-on indoor positioning system (IPS) controller for a light-emitting diode (LED) lighting device, comprising:
   a power input port;
   a power output port;
   a housing;
   a control unit disposed in the housing, the control unit comprising a two-way wireless module; and
   at least one data signal receiver disposed in the control unit,
   wherein:
      a power input of the control unit is connected to the power input port,
      a power output of the control unit is connected to the power output port,
      the at least one data signal receiver is configured to receive external data signals,
      the control unit is configured to activate the power output port to supply output voltage when the control unit receives an "ON" signal, and
      the control unit is configured to deactivate the power output port when the control unit receives an "OFF" signal.

2. The light-source-less add-on IPS controller of claim 1, wherein the control unit further comprises a visible light communication (VLC) module which is configured to convert the received data signals into one or more light intensity baseband modulation (LIBM)-modulated signals by varying a frequency at which one or more LEDs of the LED lighting device are turned on and off and by varying a light intensity of the one or more LEDs.

3. The light-source-less add-on IPS controller of claim 1, wherein the control unit further comprises a dimmer configured to control the output voltage or a current flowing through the power output port according to the received data signals.

4. The light-source-less add-on IPS controller of claim 3, wherein the dimmer comprises a voltage-based step-dimmer configured to control the output voltage of the power output port according to the received data signals.

5. The light-source-less add-on IPS controller of claim 4, wherein the voltage-based step-dimmer comprises a control signal input port, a controllable switcher, and a transformer, wherein the control signal input port is connected to the controllable switcher, wherein an output of the controllable switcher is connected to an input of the transformer, and wherein an output of the transformer is connected to the power output port.

6. The light-source-less add-on IPS controller of claim 5, wherein the voltage-based step-dimmer is configured to supply power at a voltage level same as an external input power, at a voltage level lower than the external input power, or at zero voltage.

7. The light-source-less add-on IPS controller of claim 3, wherein the dimmer comprises a voltage-based linear dimmer comprising a control signal input port, a step-motor, and an autotransformer, where the control input signal port is connected to and configured to control the step-motor, wherein the step-motor is configured to control an input level of the autotransformer and cause an output level of the autotransformer to change in a linear fashion.

8. The light-source-less add-on IPS controller of claim 3, wherein the dimmer comprises a current-based linear dimmer configured to control an effective operation cycle of an alternating current (AC) input current wave from 360 degrees down to 0 degree in a linear or step-wise fashion according to a control signal.

9. The light-source-less add-on IPS controller of claim 1, wherein the data signal receiver comprises a photo diode or a light sensing component configured to receive two-way VLC communication.

10. The light-source-less add-on IPS controller of claim 1, wherein the control unit further comprises a rectifier configured to convert an alternating current (AC) input current to a direct current (DC) output current.

11. The light-source-less add-on IPS controller of claim 1, wherein the controller further comprises a connecting mechanism configured to attach the controller directly onto the LED lighting device.

12. The light-source-less add-on IPS controller of claim 11, wherein the connecting mechanism, configured to be disposed between the controller and the LED lighting device, comprises the power output port comprising a socket which is a screw-in shaped socket, hole-shaped socket, or an existing standard electrical socket.

13. The light-source-less add-on IPS controller of claim 12, wherein the housing defines a concavity configured to house the socket of the power output port.

14. The light-source-less add-on IPS controller of claim 11, wherein the power input port comprises a connector which is a screw-in shaped connector, pin-shaped connector, or an existing standard electrical connector.

15. The light-source-less add-on IPS controller of claim 11, wherein a shape of the power input port matches a shape of the power output port.

16. The light-source-less add-on IPS controller of claim 11, wherein a shape of the power input port does not match a shape of the power output port.

17. The light-source-less add-on IPS controller of claim 1, wherein the at least one data signal receiver is configured to receive the external data signals through infra-red signals, WiFi signals, Bluetooth signals, low-energy Bluetooth signals, power-line-transmitted signals, a control signal line, or a combination thereof.

18. The light-source-less add-on IPS controller of claim 1, wherein the data signal receiver is configured to wirelessly receive the external data signals through the two-way wireless module from an external data source.

19. The light-source-less add-on IPS controller of claim 1, wherein the two-way wireless module is configured to send and receive data to and from an IPS server, an IPS-enabled end-user device, or both.

20. The light-source-less add-on IPS controller of claim 19, wherein the two-way wireless module is configured to receive data through infra-red signals, WiFi signals, Bluetooth signals, low-energy Bluetooth signals, other two-way wireless communication signals, or a combination thereof.

21. The light-source-less add-on IPS controller of claim 1, further comprising at least one LED driver.

22. The light-source-less add-on IPS controller of claim 1, wherein the control unit is further configured to provide a feedback in response to end-user triggered control signals.

23. The light-source-less add-on IPS controller of claim 22, wherein the feedback comprises one or more visual signals, one or more audible signals, one or more other discernable signals, or a combination thereof, that are perceivable by a human or detectable by an electronic device.

24. The light-source-less add-on IPS controller of claim 23, wherein the control unit is configured to provide the feedback by activating and deactivating one or more LEDs of the LED lighting device to be visually perceivable by human eyes.

25. A light-emitting diode (LED) lighting device, comprising:
a power input port configured to receive an external power;
at least one LED driver;
one or more LEDs; and
a control unit comprising at least one control signal receiver and a visible light communication (VLC) module;
wherein:
the control signal receiver is configured to receive external data signals through infra-red signals, WiFi signals, Bluetooth signals, low-energy Bluetooth signals, power-line-transmitted signals, a control signal line, or a combination thereof;
the VLC module is configured to convert the received data signals into one or more light intensity baseband modulation (LIBM)-modulated signals by varying a frequency through the at least one LED driver which turns on and off the one or more LEDs by varying a light intensity of the one or more LEDs;
the control unit is configured to provide a feedback in response to end-user triggered control signals;
the feedback comprises one or more visual signals, one or more audible signals, one or more other discernable signals, or a combination thereof, that are perceivable by a human or detectable by an electronic device; and
the control unit is configured to provide the feedback by activating and deactivating one or more LEDs of the LED lighting device to be visually perceivable by human eyes.

26. The LED lighting device of claim 25, wherein the control unit further comprises a two-way wireless module which is configured to receive the external data signals through infra-red signals, WiFi signals, Bluetooth signals, low-energy Bluetooth signals, other two-way wireless communication signals, or a combination thereof.

* * * * *